United States Patent [19]

Perry

[11] Patent Number: 4,829,706

[45] Date of Patent: May 16, 1989

[54] PEST EXTERMINATION METHOD AND APPARATUS

[76] Inventor: John C. Perry, 3170 Falcoñ Dr., Carlsbad, Calif. 92008

[21] Appl. No.: 922,718

[22] Filed: Oct. 24, 1986

[51] Int. Cl.⁴ .............................................. A01M 13/00
[52] U.S. Cl. ......................................... 43/125; 43/127
[58] Field of Search ....................... 43/124, 107, 132.1, 43/125, 127, 129; 56/12.2, 16.9, 16.7, 320.1

[56] References Cited

U.S. PATENT DOCUMENTS

| | | |
|---|---|---|
| 356,498 | 1/1897 | Payne . |
| 1,117,063 | 11/1914 | Lake . |
| 1,292,624 | 1/1919 | Magness . |
| 1,309,193 | 7/1919 | Garrison ................................ 43/127 |
| 1,403,461 | 1/1922 | Van Meter . |
| 1,492,732 | 5/1924 | Knopf ..................................... 43/124 |
| 1,529,785 | 3/1925 | Hammond et al. . |
| 1,614,015 | 1/1925 | Neuls . |
| 1,727,457 | 9/1929 | Van Meter . |
| 1,872,676 | 8/1932 | Castonguay . |
| 1,930,588 | 10/1933 | Dibble . |
| 2,467,922 | 4/1949 | Woytal ................................... 43/125 |
| 2,561,684 | 7/1951 | Blundell ................................ 43/127 |
| 2,745,210 | 5/1956 | Hild ....................................... 43/125 |
| 4,026,330 | 5/1977 | Dunn ..................................... 43/124 |
| 4,497,217 | 7/1986 | Narita ................................... 43/124 |
| 4,624,070 | 11/1986 | Query .................................. 43/132.1 |
| 4,637,161 | 1/1987 | Turner ................................ 43/132.1 |

FOREIGN PATENT DOCUMENTS 220092 9/1976 Australia ............................. 56/12.2

Primary Examiner—Gene P. Crosby
Attorney, Agent, or Firm—Donald R. Nyhagen

[57] ABSTRACT

Readily portable apparatus for exterminating animal pests, particularly rodents such as gophers which burrow through the ground. The apparatus includes a small, lightweight internal combustion engine, and means for directing the engine exhaust into exterminating relationship to the pests, such as into a burrow or tunnel of a ground burrowing rodent. The preferred engine is a two-cycle engine which burns a fuel/oil mixture to produce exhaust containing smoke which asphyxiates, carbon monoxide which effectively poisons, and intense pressure pulsations which tend to drive a rodent from an underground tunnel, such that the rodent faces the delema of remaining underground and dying from the effects of the exhaust gas or coming to the surface and exposing himself to death in other ways above ground. In the presently preferred apparatus, the engine is mounted on an inverted bowl-shaped exhaust shroud which seats on the ground to direct the engine exhaust into an underground rodent burrow. A second disclosed embodiment has a perforated probe which is pushed through the ground into a rodent tunnel to direct exhaust gas into the tunnel. Both embodiments have provision for connection to a dual outlet hose to be inserted into an entrance to an underground tunnel system for directing exhaust gas into tunnels leading in opposite directions from the entrance.

14 Claims, 7 Drawing Sheets

PEST EXTERMINATION METHOD AND APPARATUS

BACKGROUND OF THE INVENTION

1. Field

This invention relates generally to the field of animal pest control and more particularly to a novel pest extermination method and apparatus.

Prior Art

As will appear from the ensuing description, the invention may be utilized to control or exterminate any type of animal pest against which the invention is effective. The invention is particularly concerned, however, with controling or exterminating rodents which burrow through the ground and especially gophers, moles and the like. For this reason, the invention will be described in this context.

Virtually all ground areas are subject to invasion by burrowing rodents of the kind referred to, and especially gophers. Their destructive actions are well known and need not be elaborated. Suffice to say that gophers burrow into and through the soil which produces unsightly holes in the ground, dirt mounds, cave-ins and other unsightly conditions. Gophers also destroy grass, plants, crops and the like by eating their roots from below the ground. As a result, gophers are particularly annoying and troublesome pests for residential yards, parks, golf courses, farms, and other planted areas which must be maintained in some way.

A variety of procedures and devices have been devised for exterminating such rodents Foremost among these are gassing and flooding the underground rodent burrows and traps set in the burrows. Examples of gassing procedures and devices for exterminating burrowing rodents and other animal pests are described in the following patents.

| | | |
|---|---|---|
| 356,498 | 1,117,063 | 1,292,624 |
| 1,309,193 | 1,403,461 | 1,492,732 |
| 1,529,785 | 1,614,015 | 1,727,457 |
| 1,872,676 | 1,930,588 | 2,467,922 |
| 2,561,684 | 2,745,210 | |

None of the existing rodent extermination procedures and devices are very effective. Moreover, the prior gassing procedures either required large engine powered vehicles as an exhaust gas source or desposable gas producing units which had to be replaced at relatively high cost, generally after each use. Accordingly, a need exists for an improved pest extermination procedure and apparatus. This invention provides an improved method and apparatus for extermination of animal pests, particularly burrowing rodents such as gophers.

SUMMARY

According to one of its aspects, the invention provides an exterminator having an internal combustion engine which produces an exhaust gas containing an asphyxiator in the form of smoke and a poison in the form of carbon monoxide. This exhaust has a dual killing action involving asphyxiation by the smoke and poisoning by the carbon monoxide. If one of these killing agents does not kill the pest being exterminated, the other killing agent will. The engine also produces pressure pulsations which tend to drive the rodent from the tunnel. Thus, the rodent is forced to either remain in the tunnel and die from the exhaust gas or leave the tunnel and expose himself to death above ground.

The preferred internal combustion engine for this purpose is a two-cycle engine which burns a mixture of gasoline and lubricating oil and produces intense pressure pulsations. Combustion of the gasoline produces carbon monoxide. Burning of the oil produces smoke.

According to another aspect of the invention, the exterminator is relatively small, light weight, compact, and totally self-contained, such that the exterminator can be easily carried in one hand and is therefore readily portable.

Utilizing, as it does, an internal combustion engine to produce the lethal pest killing agent, namely the engine exhaust, the exterminator is extremely economical to operate over long periods of time since the only commodity which must be purchased is gasoline.

The presently preferred embodiments of the invention are designed to exterminate burrowing rodents, especially gophers. In one of these embodiments, which is the present best mode embodiment, the exhaust gas directing means is an inverted bowl-shaped exhaust shroud. The engine is mounted on top of this shroud and discharges its exhaust gas into the shroud In use, the shroud is placed on the ground over a hole opening to underground rodent burrows or tunnels with the lower rim of the shroud resting on the ground to seal the shroud to the ground. The exhaust gas produced by engine operation passes through the lower open side of the shroud into the ground opening and thence into the tunnels. The shroud also serves as a base for supporting the exterminator on the ground.

In another presently preferred embodiment, the exhaust gas directing means is a rigid hollow probe having a lower perforated tip to be pushed into the ground to a position wherein the probe perforations are situated within an underground rodent tunnel. The engine exhaust is thus expelled through these perforations into the tunnel. Like the shroud, this probe provides a base for supporting the exterminator on the ground.

Both embodiments are adapted for use with alternate exhaust gas directing means, each having a flexible tube to be coupled to at one end to an exhaust gas outlet on the exterminator. The tube of one of these exhaust gas directing means is forked at its opposite end to provide dual tube outlet ends to be inserted through an entrance to a tunnel system and into the ends of the two rodent tunnels which generally lead in opposite directions from an entrance. This forked tube, then, directs engine exhaust gas into both tunnels simultaneously. The tube of the other alternate exhaust gas directing means terminates in a perforated tip to be inserted through the ground into an underlying tunnel in much the same way as the perforated probe referred to above.

DRAWINGS

PREFERRED EMBODIMENTS

Figure 1:
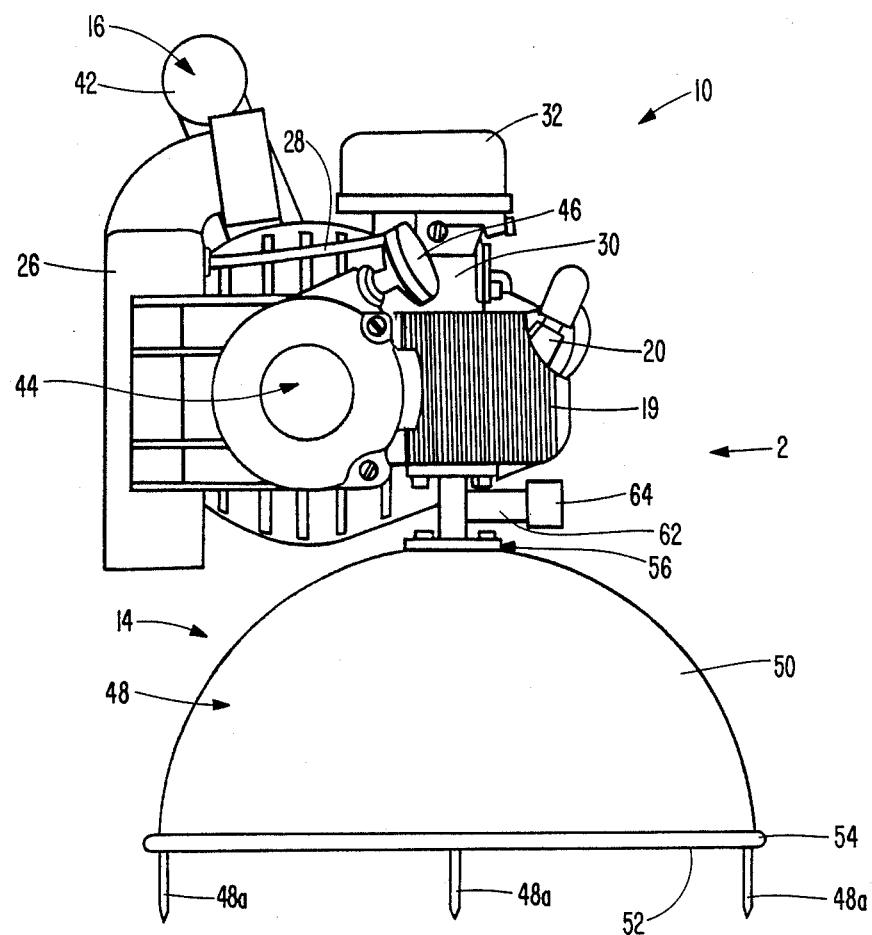
FIG. 1 is a side elevation of an exterminator according to the invention.

Turning first to FIGS. 1-4, the illustrated pest exterminator 10 comprises an internal combustion engine 12 and means 14 for directing the engine exhaust gas into the vicinity of the pests to be exterminated. According to one preferred feature of the invention, the exterminator is a relatively compact, lightweight, portable, totally self contained unit which may be easily carried with one hand and used in virtually any location. A typical exterminator of the kind illustrated in FIGS. 1 and 2, for example, may weigh on the order of 10 pounds and measure about 1½ feet in height, as viewed in the drawings, and about 1½ feet in its maximum lateral dimension. The exterminator has a handle 16 by which it may be carried.

According to another preferred feature of the invention, the internal combustion engine 12 is one whose exhaust gas contains both an asphyxiator in the form of smoke and a poison in the form of carbon monoxide.

Both of the foregoing featured are accomplished by utilizing as the engine 12 a small, relatively lightweight two-cycle engine which burns a mixture of gasoline and oil. Combustion of the gasoline produces carbon monoxide. Burning of the oil produces smoke.

As mentioned earlier, the invention contemplates within its broader aspects and scope the elimination of any pests which can be exterminated with engine exhaust gas and into the vicinity of which the engine exhaust gas may be effectively directed by suitably designed exhaust gas directing means 14 which include a base for supporting the exterminator on the ground. The particular pest exterminators illustrated in the drawings are designed for exterminating ground burrowing rodents, especially gophers. Even these illustrated exterminators, however, may be used for any other extermination purposes for which they may be capable.

Figure 2:
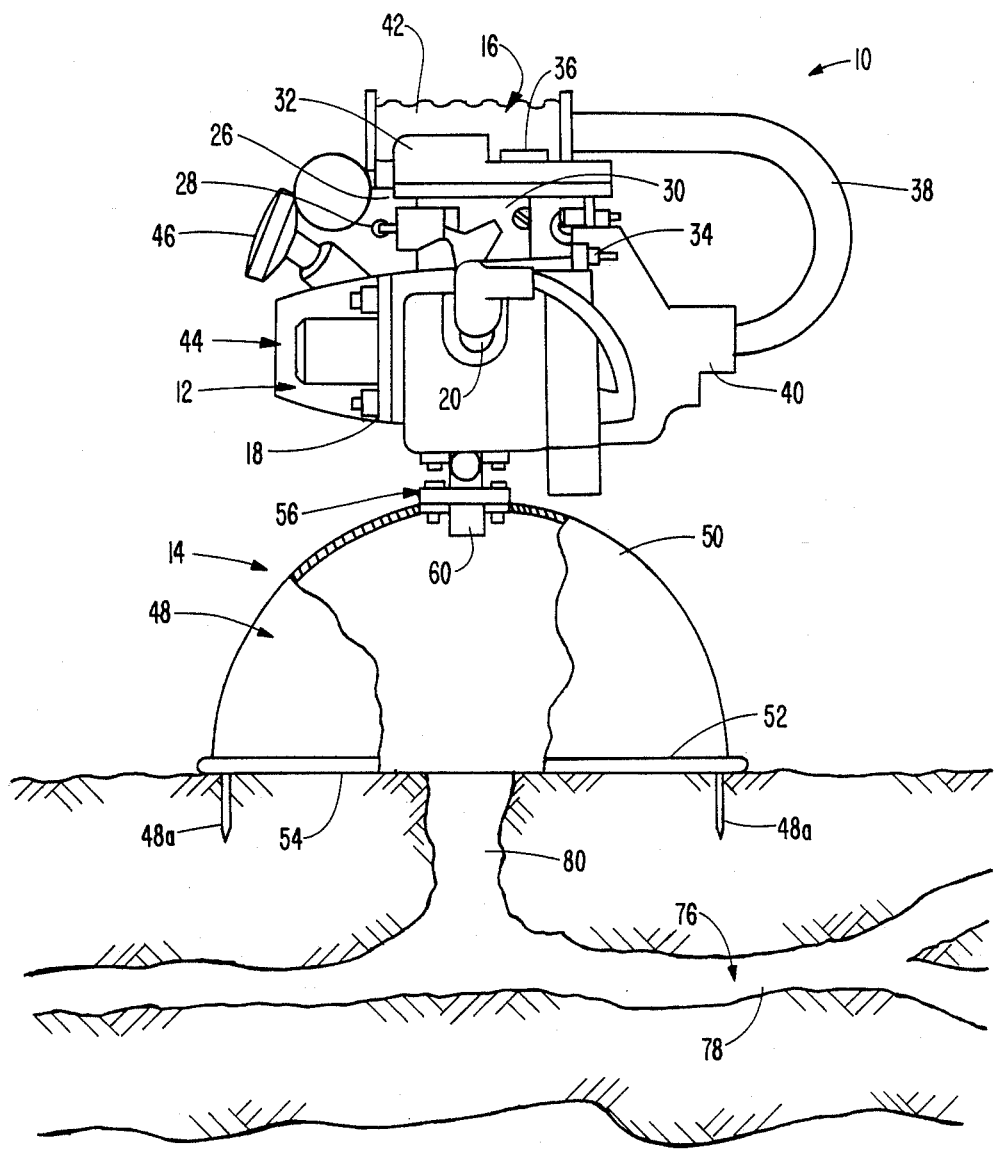
FIG. 2 is a side elevation, partly broken away, looking in the direction of arrow 2 in FIG. 1 and showing the exterminator in a position of use over an underground gopher tunnel.
Figure 3:
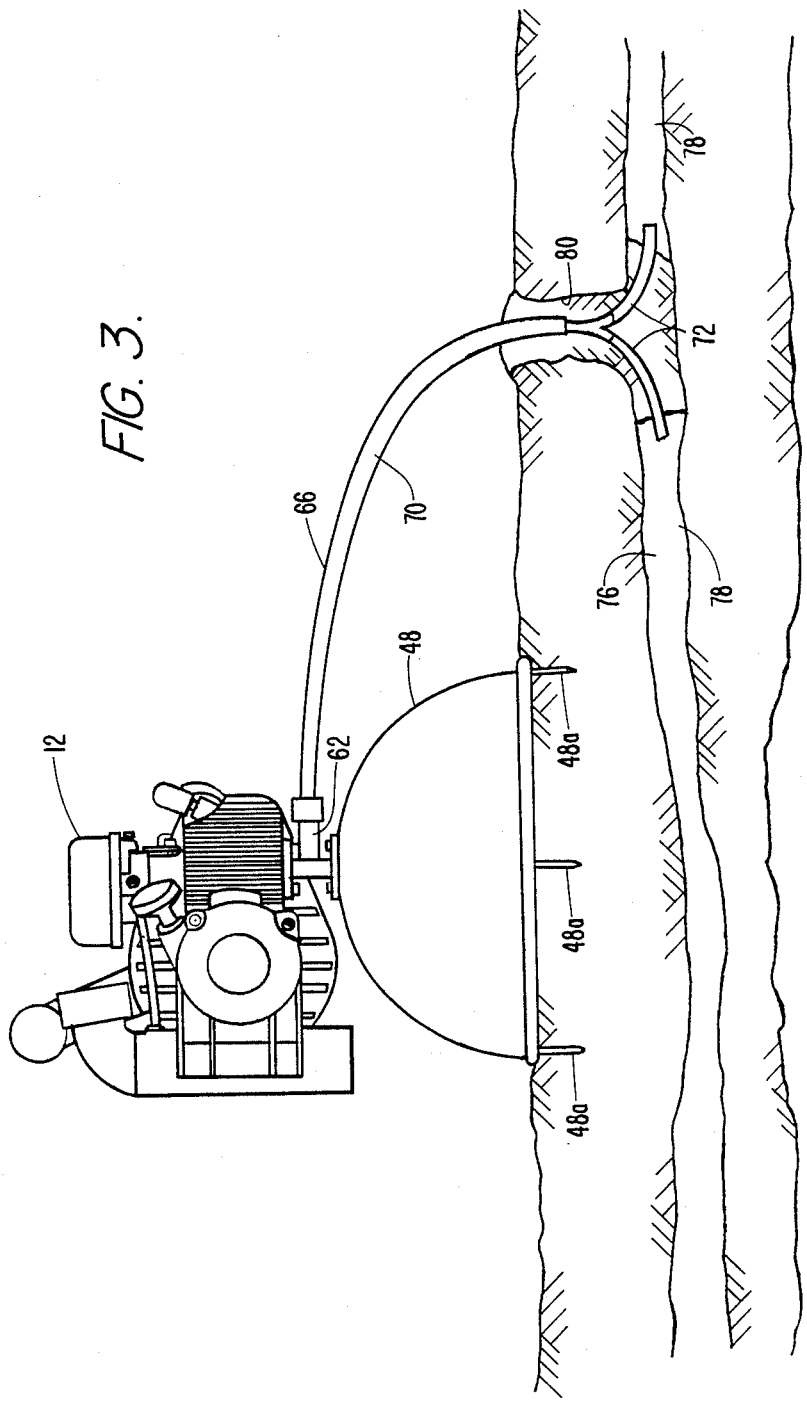
FIG. 3 illustrates an alternate mode of using the exterminator.

With this in mind, refer now in more detail to the illustrated exterminator 10 in FIGS. 1-3. The internal combustion engine 12 of the exterminator is a small two-cycle engine which is essentially conventional and hence need be described only in the detail necessary to enable a full and complete understanding of this invention. The engine has a body 18 containing a generally horizontal cylinder 19 as the engine is viewed in FIGS. 1 and 2, a piston movable in the cylinder, a crankshaft driven by the piston, and means for firing the engine spark plug 20 in timed relation to the reciprocating piston movement. The engine has an air intake 32 at the top of the engine body 18 as it is viewed in FIGS. 1-3 and an exhaust at the bottom of the body almost directly below the intake.

Mounted at one side of the engine body 18 is a fuel tank 26 connected by a fuel line 28 to a carburetor 30 mounted atop the engine intake. Air enters the carburetor through an air filter 32 mounted on the carburetor. Carburetor 30 includes an adjustable throttle mechanism 34 and an adjustable choke mechanism controlled by a choke lever 36 on the air filter 32.

The exterminator carrying handle 16 has a generally U-shaped handle bar 38 having one end fixed within a boss 40 extending out from one side of the engine body 18. The opposite end of the handle bar curves up and over the engine and mounts a handgrip 42 located directly above the engine, to one side of the air filter 32.

Mounted on the engine body 18, almost directly opposite the handle mounting boss 40, is a recoil starter 44 for the engine 12. This starter has starter cord (not shown) attached to pull 46 by which the cord may be pulled to start the engine.

In the particular exterminator 10 shown in FIGS. 1 and 2, the exhaust gas directing means 14 for directing the exhaust of engine 12 into the vicinity of the pests to be exterminated comprises an inverted exhaust bowl-shaped exhaust shroud 48. This shroud has a normally upper dome-shaped wall 50 and an open, normally bottom side 52 surrounded by a rim 54 of the shroud. This exhaust shroud is located directly below the engine 12, approximately coaxially with the engine exhaust.

Rigidly and coaxially fixed to the top of the exhaust shroud wall 50 is a tubular fitting 56 containing a central exhaust passage which opens upwardly through the upper end of the fitting and downwardly into the interior of the shroud. The upper end of the fitting 56 is secured to the engine exhaust. Accordingly, during operation of the engine 12, the engine exhaust gas exits into the exhaust shroud 48. The particular exhaust shroud illustrated has an interior outlet 60 through which the exhaust gas is discharged downwardly into the shroud.

The exhaust fitting 56 has a lateral exhaust gas tap or outlet tube 62 closed by a removable cap 64. This outlet tube is adapted to removably receive either of the alternative exhaust gas directing means 66 and 68 of FIGS. 3 and 4. The exhaust gas directing means 66 comprises a flexible hose 70 to be coupled at one end to the exhaust fitting outlet tube 62 and having an opposite forked end including a pair of flexible open tubular ends or nozzles 72. The exhaust gas directing means 68 of FIG. 4 comprises a flexible hose 74 to be coupled at one end to the exhaust fitting outlet tube 62 and having at its other end a rigid probe 75 with a perforated tip.

The operation of the exterminator 10 will now be described in connection with FIG. 2 illustrating how a typical underground gopher burrow or tunnel network 76 might look. The network includes a plurality of interconnecting tunnels 78 extending in various directions through the ground and one or more entrances 80 opening through the ground surface. Each entrance 80 is generally surrounded by a dirt mound and joins a pair of underground tunnels 78 which extend in opposite directions from the entrance.

According to one operating mode of the exterminator 10, the exhaust outlet 62 on the exhaust fitting 56 is closed by the cap 64. The exterminator is placed on the ground with its exhaust shroud 48 over a tunnel entrance 80 and the shroud rim 52 resting on the ground about the passage to seal the shroud to the ground, as shown. The shroud thus serves as a base for supporting the exterminator on the ground. The shroud may have spikes 48a for anchoring it to the ground.

When the engine 12 is operated in this position, engine exhaust gas entering the exhaust shroud 48 is forced into the tunnel entrance and from there into the underground tunnel or tunnels 78 leading from the passage. It will be obvious, of course, that instead of placing the exterminator over an entrance made by a gopher or other burrowing rodent, it could be placed over a hole which is dug into the ground so as to open an underground tunnel. In this regard it will be recognized that an underground rodent burrow or tunnel may be located by probing the ground with a spike or the like.

An alternative mode of using the exterminator 10 is shown in FIG. 3. In this case, the exhaust shroud 48 is placed on the ground at one side of a tunnel 80 in such a way that the ground effectively closes the bottom of the shroud. The exhaust fitting cap 64 is removed and the flexible hose 70 of the exhaust gas directing means 66 is coupled to the fitting outlet 62. The forked end of the tube is then inserted downwardly into the tunnel entrance in such a way that the forked tube discharge ends 72 extend into the two tunnels 78, respectively, extending from the entrance. Dirt is then packed about the forked tube end. When the engine 12 is operated in this mode, the hose 70 directs the engine exhaust gas into the two tunnels 78 leading from the entrance.

Figure 4:
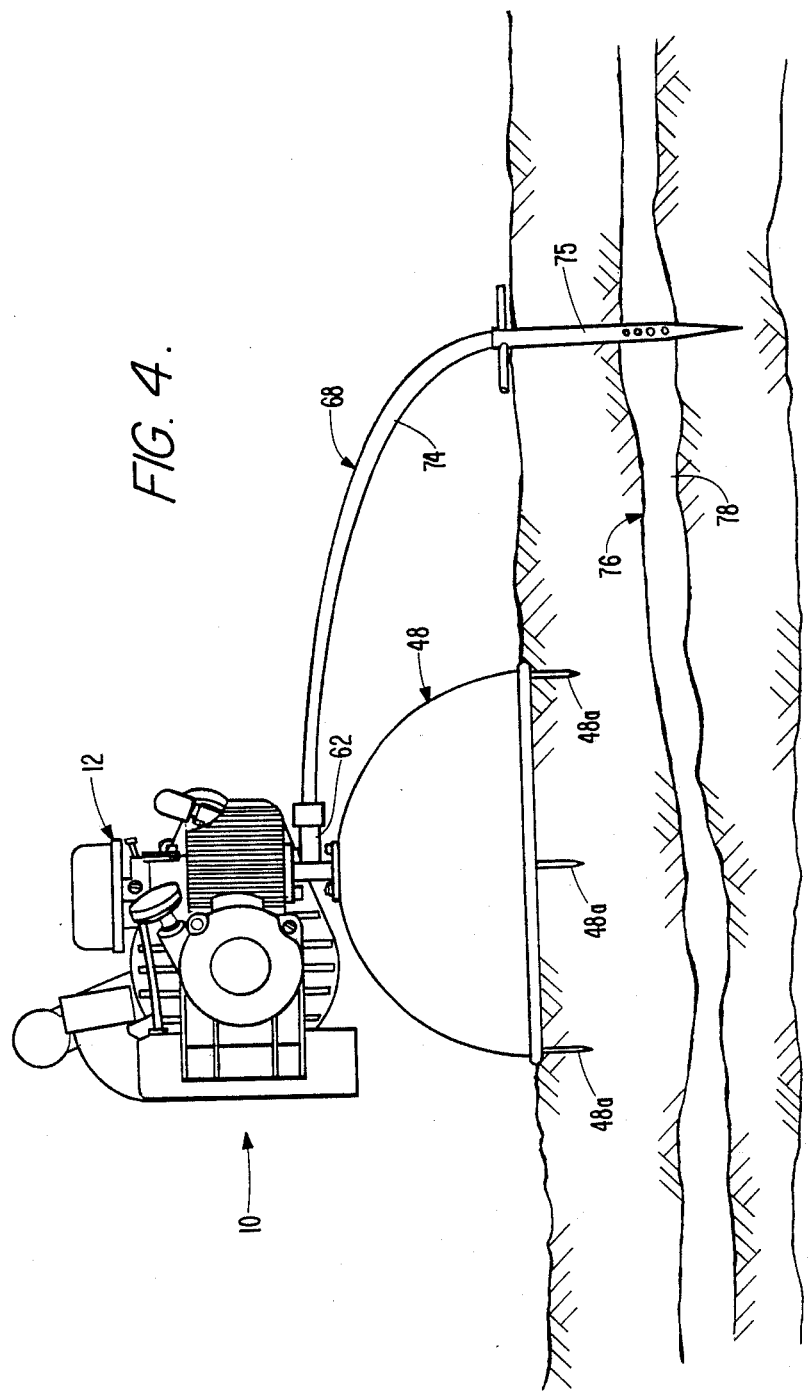
FIG. 4 illustrates a further alternate mode of using the exterminator.

FIG. 4 illustrated another alternative mode of using the exterminator 10 with the exhaust gas directing means 68 in place of the exhaust directing means 66. This latter mode of use is identical to that using the exhaust directing means 66 except perforated probe 75 of the means 68 is pushed through the ground into an underground tunnel 78. When the engine 12 is operated in this mode, the engine exhaust gas is directed into the tunnel through the probe perforations.

As noted earlier, an important feature of the invention resides in the fact that the engine 12 of the exterminator 10 produces exhaust gas containing both an asphyxiator in the form of smoke and a poison in the form of carbon monoxide. The smoke irritates and asphyxiates the animals in the tunnels. The carbon monoxide kills by producing a condition known as carbon monoxide poisoning. This dual killing feature of the invention is very important and is believed to render the present exterminator very effective. As noted earlier, the dual killing feature is preferably accomplished by using a two-cycle engine which burns a mixture of oil for producing the smoke and gasoline for producing the carbon monoxide.

According to a further feature of the invention, the engine exhaust contains intense pressure pulsations, particularly with a two-cycle engine. These pulsations tend to drive a gopher from the tunnel. This presents the gopher with the dilemma of remaining in the tunnel and exposing himself to the dual killing engine exhaust or leaving the tunnel and exposing himself to death on the surface.

Another important feature of the exterminator 10 is its easy portability resulting from its lightweight, small size and compact construction. The exterminator can easily be carried in one hand and, in addition, can be easily stored when not in use. The exterminator is also obviously inexpensive to operate, even over long periods of time, and does not require replacement after each use of a disposable smoke or gas producing unit or the like which are quite costly.

Figure 5:
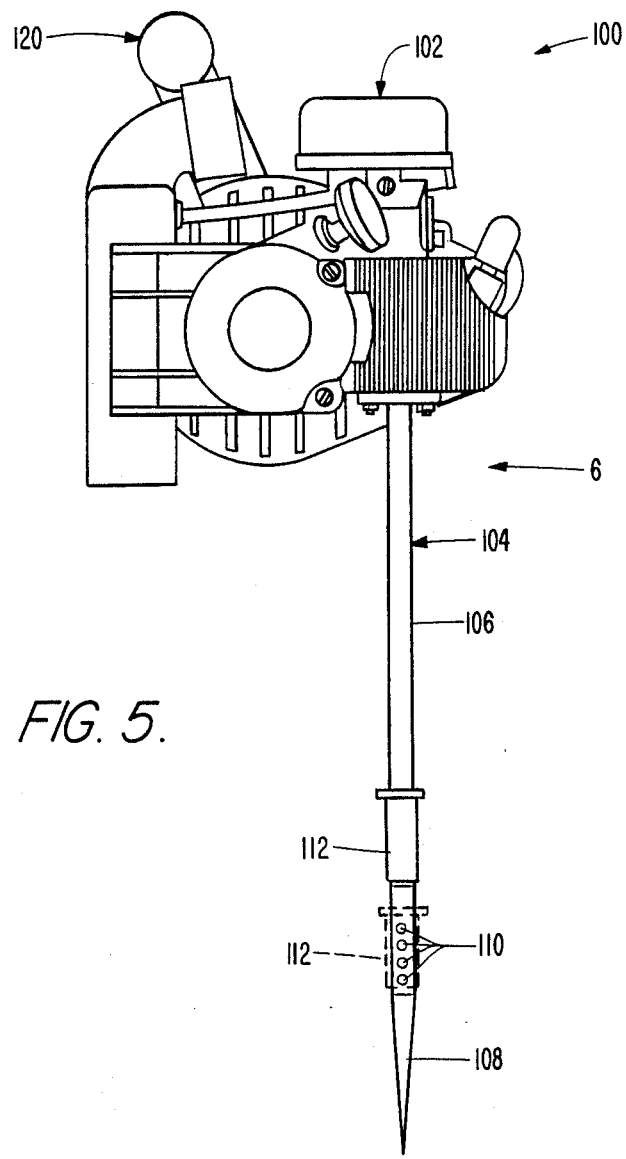
FIG. 5 is a side elevation of a modified exterminator according to the invention.
Figure 6:
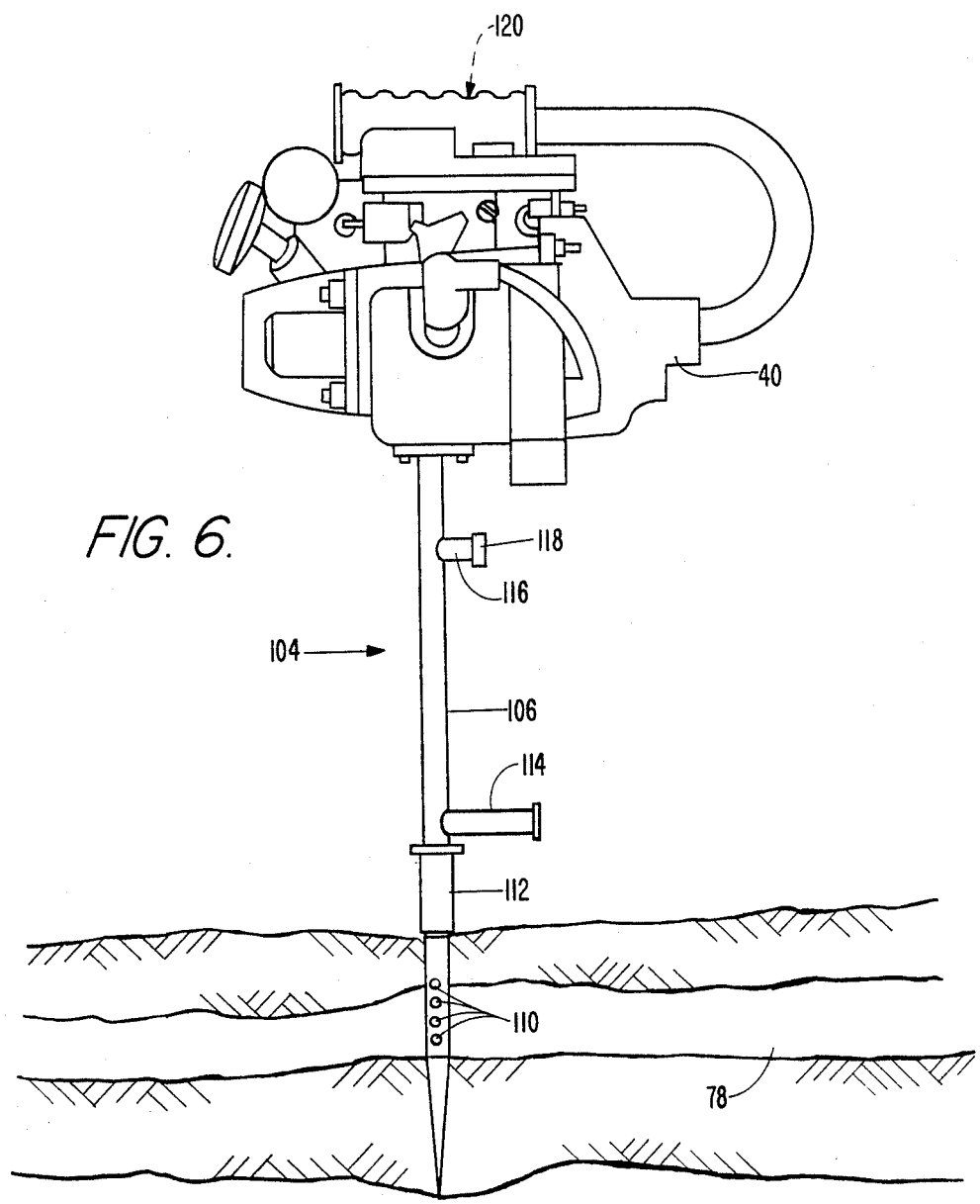
FIG. 6 is a side elevation looking in the direction of arrow 6 in FIG. 5 and showing the exterminator in a position of use over a gopher tunnel.
Figure 7:
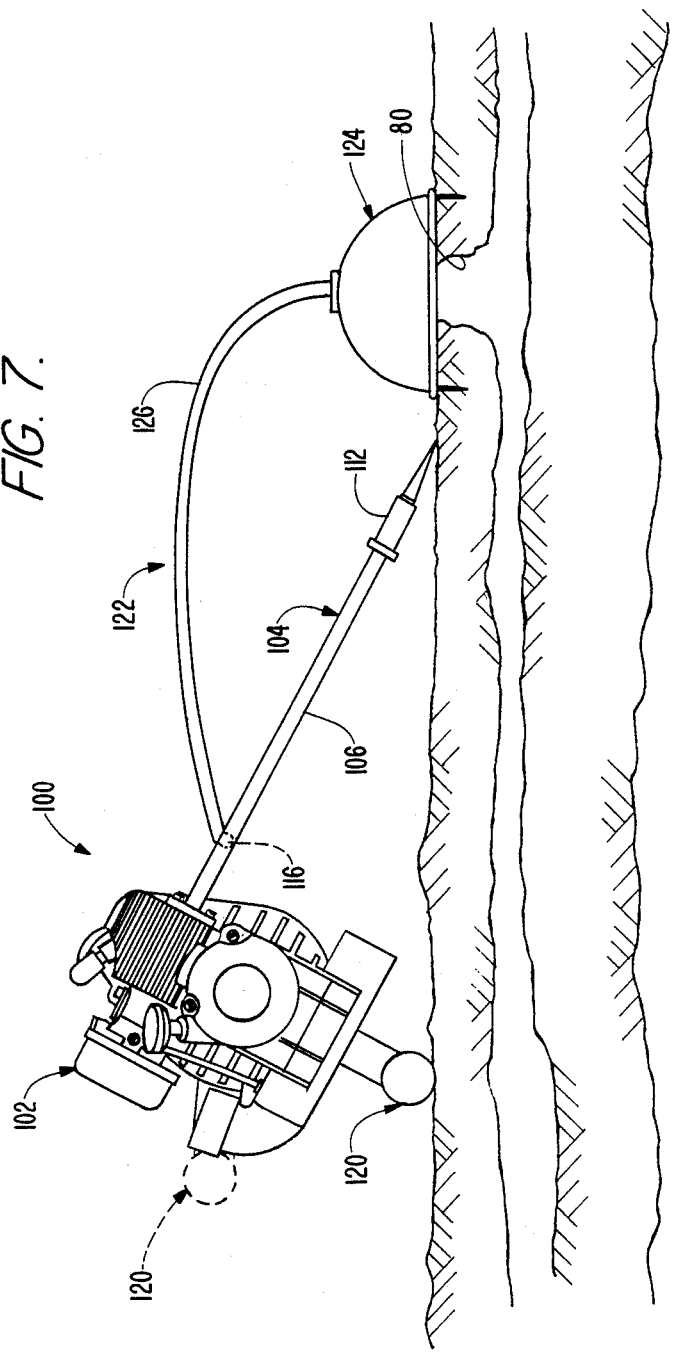
FIG. 7 illustrates an alternate mode of using the exterminator of FIGS. 5 and 6.

The modified exterminator 100 of FIGS. 5-7 is similar to the exterminator 10 just described in that exterminator 100 has an internal combustion engine 102 and means 104 for directing the engine exhaust gas into the vicinity of the pests to be exterminated. As with the illustrated exterminator 10, the particular modified exterminator illustrated is designed for exterminating burrowing rodents, especially gophers.

The engine 102 of the modified exterminator 100 is identical to that of exterminator 10 and hence the engine 102 need not be described. It is suffice to say that the parts of the engine 102 which are referred to below are designated by the same reference numerals as their counterparts in engine 10.

The exhaust gas directing means 104 of the modified exterminator 100 comprises a relatively long rigid tubular probe 106 with a tapered and perforated tip 108. The upper end of the probe 106 is rigidly secured to the engine exhaust so that during engine operation, the engine exhaust gas passes downwardly through the probe and then outwardly through the holes 110 in the perforated probe tip 108. A valve sleeve 112 is slidable along the probe to close these holes.

Rigidly fixed to and extending laterally from the probe 106 near its tip 108 is a step 114 against which foot pressure may be exerted to force the probe into the ground. Above this step is a lateral exhaust gas outlet tube 116 closed by a removable cap 118.

The modified exterminator 100 has a handle 120 like the handle 16 of exterminator 10. The handle 120, however, is rotatably adjustable about the axis of the engine boss 40 which mounts the handle between its normal carrying position shown in full lines in FIGS. 5 and 6 and its solid line position of the FIG. 7. In this latter position, the handle is disposed to form a support on which the exterminator may rest in a prone position on a horizontal surface with the probe tip resting on the surface. Means are provide for releasably securing the handle in each position.

In one mode of use, shown in FIG. 6, the exterminator probe 106 is forced into the ground to a position wherein the probe tip holes 110 are situated within an underground rodent tunnel 78. The cap 118 is placed on the outlet tube 116 to close the latter. When the engine 102 is operated in this mode, the engine exhaust gas passes downwardly through the probe 106 and exits through the probe tip holes 110 into the tunnel 78. The probe also serves as a base for supporting the exterminator on the ground.

In another mode of using the exterminator 100 shown in FIG. 7, the valve sleeve 112 is moved to a closed position over the probe tip holes 110. The exterminator is placed in a prone position, resting on the handle 120, as shown in FIG. 7. The cap 118 on the probe outlet tube 116 is removed and an auxiliary exhaust gas directing means is connected to the outlet tube. In FIG. 7, the auxiliary exhaust gas directing means 122 comprises a shroud 124, similar to shroud 48, connected by a flexible hose 126 to the outlet tube 116 and adapted to be placed over a tunnel entrance 80. Either of the auxiliary exhaust gas directing means 66, 68 could be used in place of the exhaust gas directing means 132.

This second embodiment of the invention has the same dual killing feature, exhaust pulsation feature, and easy portability feature as the exterminator 10 first described.

When an exterminator is used with an auxiliary exhaust gas directing means in the manner shown in FIGS. 3, 4 and 7, the shroud 48 in FIGS. 3 and 4 and the probe 104 and handle 120 in FIG. 7 effectively form engine supports for supporting their engines 12 on the ground while the engine exhaust is conducted through the auxiliary exhaust gas directing means to the rodent site to be gassed. If desired, of course, both the primary gas directing shroud 48 or probe 104 and the auxiliary gas directing means 66, 68 or 122 may be used simultaneously.

I claim:

1. Apparatus for exterminating ground burrowing pests comprising:

a totally self-contained relatively small, lightweight, easily portable exterminator unit capable of being carried by a person, and wherein said exterminator unit comprises an internal combustion engine having a body and an exhaust outlet, a handle having a hand grip over and secured directly to said engine body for carrying the unit, and a base secured to said engine body having a lower exhaust opening communicating with said engine exhaust outlet for supporting said exterminator unit on the ground with said lower exhaust opening communicating with an underground burrow for conducting engine exhaust gas to the underground burrow and with said base disposed in relatively effective sealing contact with the ground between said lower exhaust opening and the atmosphere above the ground.

2. Apparatus for exterminating ground burrowing pests comprising:

a totally self-contained relatively small, lightweight, easily portable exterminator unit capable of being carried by person, and wherein said exterminator unit comprises an internal combustion engine having a body and an exhaust outlet, and a base secured to said engine body for both supporting said exterminator unit on the ground and conducting engine exhaust gas to an underground burrow, said engine base comprising a shroud fixed to said engine body and having an open, normally bottom side bounded circumferentially by a rim and adapted to be placed on the ground over a ground opening to a burrow with said rim seating against the ground to provide a relatively effective seal between the shroud and the ground about the open bottom of the shroud, and means communicating the interior of the shroud to the engine exhaust outlet.

3. Extermination apparatus according to claim 2 wherein:

said shroud has a normally upper wall, and
said engine body is mounted directly on said upper wall.

4. Apparatus for exterminating ground burrowing pests comprising:

a totally self contained relatively small, lightweight, easily portable exterminator unit capable of being carried by a person, and wherein said exterminator unit comprises an internal combustion engine having a body and an exhaust outlet, and a base secured to said engine body for both supporting said exterminator unit on the ground and conducting engine exhaust gas to an underground burrow, said engine base comprising a rigid probe having a normally upper and secured to said engine body and a normally lower end to be pushed into the ground to enter an underlying burrow and to support said exterminator unit on the ground, and an exhaust passage communicating with the engine exhaust outlet and opening thru the lower end of the probe for discharge of engine exhaust gas from the probe into the burrow.

5. Extermination apparatus according to claim 4 wherein:

said probe comprises a rigid tube containing said exhaust passage, and
said engine body is rigidly mounted on the upper end of said probe tube.

6. Relatively small, lightweight, easily portable apparatus for exterminating animal pests, comprising:

a shroud having an open normally bottom side,
an internal combustion engine having an exhaust outlet communicating to the interior of said shroud,
an engine exhaust tap communicating with said engine exhaust outlet for connection to a tube for conducting engine exhaust to a selected location, and
means for selectively closing said exhaust tap.

7. Relatively small, lightweight, easily portable apparatus for exterminating animal pests, comprising:

an internal combustion engine having an exhaust outlet,
a relatively stiff and non-bendable probe having a normally upper end secured to said engine, a normally lower end, and an exhaust passage communicating with said exhaust outlet and opening thru said lower probe end and
a handle having a hand grip over and secured directly to said engine for carrying the apparatus.

8. Extermination apparatus according to claim 7, wherein:

said probe comprises a rigid tube containing said exhaust passage.

9. Relatively small, lightweight, easily portable apparatus for exterminating animal pests, comprising:

a hollow probe having a relatively pointed end and openings in said end communicating with the interior of the probe,
an internal combustion engine having an exhaust outlet communicating with the interior of said probe,
an engine exhaust tap communicating with said engine exhaust outlet for connection to a tube for conducting engine exhaust to a selected location, and
means for selectively closing said tap.

10. Extermination apparatus according to claim 6 including:

a tube for connection at one end to said engine exhaust tap and having at its opposite end a pair of oppositely extending tube end portions forming oppositely directly exhaust outlets.

11. Extermination apparatus according to claim 9 including:

a tube for connection at one end to said engine exhaust tap and having at its opposite end a pair of oppositely extending tube end portions forming oppositely directly exhaust outlets.

12. Relatively small, lightweight, easily portable apparatus for exterminating ground burrowing rodents, comprising:

an internal combustion engine having an exhaust outlet,
a tube for directing exhaust from said engine into an underground rodent burrow thru a ground opening which intersects the burrow in such a way that sections of the burrow extend in two opposite directions from the opening, and wherein said tube has one end connected to said engine exhaust outlet and an opposite end comprising a pair of oppositely extending tube end portions forming oppositely directed exhaust outlets to be inserted thru said ground opening into the burrow in such a way that said tube outlets extend and open into said burrow sections, respectively.

13. Relatively small, lightweight, easily portable apparatus for exterminating animal pests, comprising:
  a shroud having an open normally bottom side bounded circumferentially by a rim and adapted to be placed on the ground over an opening to an underground pest burrow with the open side of the shroud facing the ground, said apparatus being devoid of any obstruction which would prevent contact of said rim with the ground, whereby the shroud may be placed on the ground with said rim in contact with the ground to form a relatively effective seal between the shroud and the ground about said open side of the shroud, and
  an internal combustion engine rigidly attached to said shroud and having an exhaust outlet communicating to the interior of the shroud.

14. Relatively small, lightweight, easily portable apparatus for exterminating animal pests, comprising:
  a shroud having a normally upper wall and an open normally bottom side bounded circumferentially by a rim and adapted to be placed on the ground over an opening to an underground pest burrow with the open side of the shroud facing the ground, said apparatus being devoid of any obstruction which would prevent contact of said rim with the ground, whereby the shroud may be placed on the ground with said rim in contact with the ground to form a relatively effective seal between the shroud and the ground about said open side of the shroud, and
  an internal combustion engine rigidly mounted directly on top of said upper shroud wall and having an exhaust outlet communicating to the interior of the shroud.

* * * * *